United States Patent [19]  [11] 3,754,201
Adams  [45] Aug. 21, 1973

[54] HEAT SENSITIVE DETECTOR

[75] Inventor: Robert B. Adams, Tredyffrin Township, Chester County, Pa.

[73] Assignee: Moore Products Co., Spring House, Pa.

[22] Filed: Feb. 3, 1972

[21] Appl. No.: 223,601

Related U.S. Application Data

[63] Continuation-in-part of Ser. No. 618,472, Feb. 24, 1967, abandoned, and a continuation-in-part of Ser. No. 790,408, Jan. 10, 1969, Pat. No. 3,640,133.

[52] U.S. Cl. .............................. 338/28, 73/362 AR
[51] Int. Cl. ............................................. H01c 7/00
[58] Field of Search ...................... 338/22, 28, 229; 73/362 AR

[56] References Cited
UNITED STATES PATENTS 3,356,980   12/1967   Roberts .............................. 338/28
3,435,400   3/1969    Beckman ............................ 338/28
2,588,014   3/1952    Knodsen ............................ 338/28
2,933,708   4/1960    Elliot et al. ......................... 338/28
2,716,686   8/1955    Ehret ............................. 338/25 X Primary Examiner—C. L. Albritton
Attorney—Zachary T. Wobensmith, 2nd

[57] ABSTRACT

A heat sensitive detector is disclosed which includes an electrically conductive body providing a probe with a thin wall metallic end closure having a thermistor held thereagainst at the center of the closure, the body if desired having a compensating thermistor therein for temperature variation compensation.

3 Claims, 2 Drawing Figures

PATENTED AUG 21 1973 3,754,201

3,754,201

HEAT SENSITIVE DETECTOR

CROSS REFERENCE TO RELATED APPLICATION

This application is a continuation-in-part of my prior application for patent Ser. No. 618,472, filed Feb. 24, 1967, now abandoned, and of my prior application for patent for FLOW METER, filed Jan. 10, 1969 Ser. No. 790,408, now U.S. Pat. No. 3,640,133.

BACKGROUND OF THE INVENTION

1. Field of the Invention

The present invention relates to measuring apparatus and more particularly to a heat sensitive detector in contact with a fluid for measuring flow and other variables.

2. Description of the Prior Art

Sensing devices of various types have heretofore been proposed for use in flow measurement.

The U.S. Pat. to Chanaud, No. 3,279,251 shows various sensors responsive to a fluid parameter fluctuation, such as pressure, temperature or velocity and providing a signal. Reference is made specifically to the use of a hot film anemometer or a hot wire anemometer.

In my prior application for Flow Meter, filed Jan. 10, 1969, Ser. No. 790,408, now U.S. Pat. No. 3,640,133, a flow meter is shown in which a signal is made available attendant upon fluid oscillation, and the apparatus of the present invention is particularly suited for use in but is not limited to such a meter.

SUMMARY OF THE INVENTION

In accordance with the invention a heat sensitive detector is provided in contact with a fluid which includes a metallic body providing a probe having an end surface of a thin metallic closure exposed to the liquid and a temperature sensitive electrical element or sensing thermistor held in a positive engagement with the closure, an electrical conductor extending from the thermistor, and the body, through the end closure serving to provide the other conductor of the thermistor, and a temperature compensating thermistor can also be provided within the probe body.

It is the principal object of the present invention to provide an improved heat sensitive probe in which the body of the probe has a thin metallic end closure wall against which the process fluid is in contact on the exterior, and a thermistor is in contact on the interior for heat sensing and for electrical contact.

It is a further object of the invention to provide a heat sensitive detector in which a sensing thermistor is supported in an improved manner with adequate protection of the thermistor from the action of the process fluid and with thermal isolation of the thermistor from surrounding heat sinks.

It is a further object of the present invention to provide a heat sensitive detector having a thin metallic wall portion for contact by the process fluid on one face and for engagement of a thermistor on the other face and with a continuous force maintained between the thermistor and the wall portion.

It is a further object of the invention to provide a heat sensitive detector which is simple in construction and reliable in its operation.

Other objects and advantageous features will be apparent from the description and claims.

BRIEF DESCRIPTION OF THE DRAWINGS

The nature and characteristic features of the invention will be more readily understood from the following description taken in connection with the accompanying drawings forming part hereof, in which.

Figure 1:
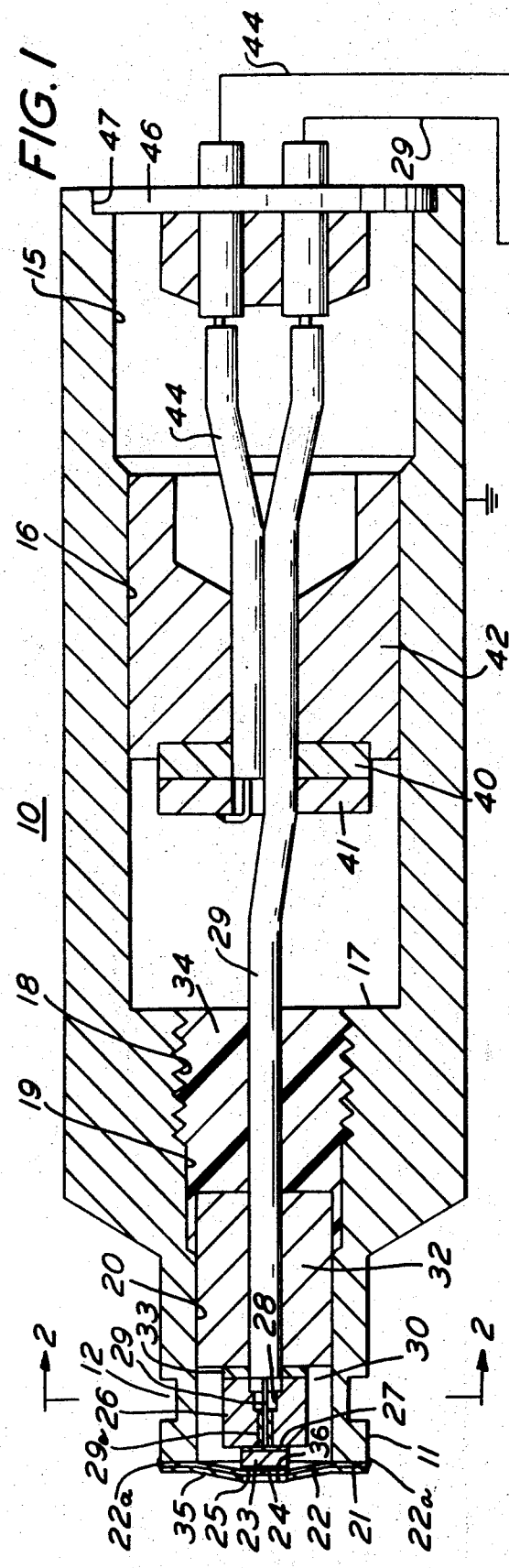
FIG. 1 is a central sectional view of measuring apparatus in accordance with the invention.
Figure 2:
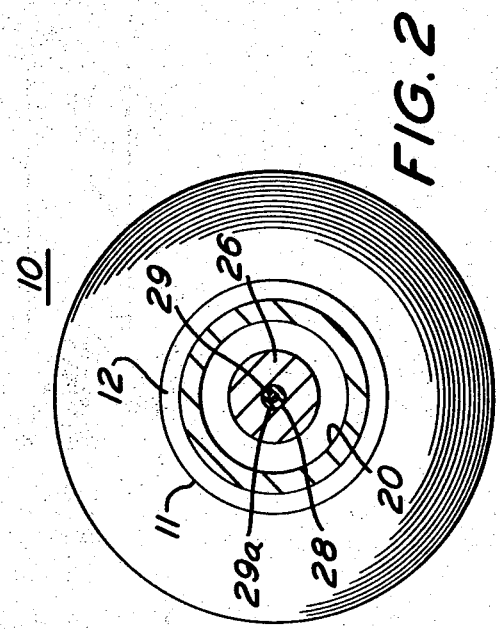
FIG. 2 is a transverse sectional view taken approximately on the line 2—2 of FIG. 1.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawings the measuring apparatus in accordance with the invention preferably includes a probe body 10, shown as generally cylindrical with a reduced end portion 11 having an annular groove 12 spaced from the end.

The interior of the body 10 has a plurality of longitudinally axially aligned portions including in succession a cylindrical portion 15, a cylindrical portion 16 terminating at a shoulder 17, an internally threaded portion 18 from which a cylindrical portion 19 extends to a cylindrical portion 20 which portion 20 extends to the end face 21 of the body 10.

The end face 21 of the body 10 has a closure 22 in the form of a disc secured thereto as at 22a in any desired manner such as by welding.

The closure 22 is preferably of metal of a thickness of less than 0.003 inches, to provide good heat conductivity therethrough to the fluid being sensed as well as a spring like action as explained below. Furthermore a thin closure 22 restricts the heat loss through the closure piece 22 to the body 10. Any suitable metal may be employed resistant to corrosion and of adequate strength, stainless steel and nickel being satisfactory for some uses.

The closure 22 has secured to the center thereof a thermistor 23 which serves as a sensing element. The thermistor 23 is preferably in the form of a disc or block having at least one flat face 24 for contact with the closure 22, the flat face 24 being at the center of the inner face of the closure 22 and with substantial clearance therearound for thermal isolation.

In order to hold the thermistor face 24 in engagement with the closure 22 for thermal conductivity and electrical conductivity it is preferred to use a conductive epoxy cement at 25 of an epoxy resin with a silver filler.

The thermistor 23 has its opposite face secured to a backup ring 26, preferably by the use of a conductive cement at 27 and as previously referred to. The ring 26 has a central opening 28 for a conductor 29 from the thermistor 23, and in which conductor 29 is secured at 29a, as by solder. The ring 26 has a clearance space 30 therearound.

In order to position the thermistor 23 at the end of the body 10, a positioning plug 32 is preferably employed having a press fit in the cylindrical portion 20 and insulating washers 31 are preferably interposed between the plug 32 and the back-up ring 26. The plug 22 is preferably forced inwardly to aid in maintaining contact between the thermistor 23 and the closure 22 and for this purpose is urged to a position to displace the center of the closure 22 about 0.003 inches outwardly from its initial flat condition.

The interior space within the threaded portion 18 can be filled as at 34 with a potting compound.

If desired, a compensating thermistor 40 can be provided within the interior of the probe body 10, mounted on a positioning plug 42 so that it is in electrical and thermal contact with the body 10.

The plug 42 can be carried in the cylindrical portion 16 and engaged therein with a press fit. The thermistor 40 has a lead 44 connected to it through metallic washer 41 which with the lead 29 extend through a hermetic sealing disc 46 carried in an end groove 47 in the body 10.

The conductor 29 provides one electrical contact for the thermistor 23, the other contact being provided by the grounded body 10. The conductor 29 is connected to a control device 50 of well known type for making a signal available through conductor 51 in response to electrical resistance changes of the thermistor 23. The thermistor 40 can be connected into the control device 50 for introducing its compensating effect.

In use, an electric current passing through the thermistor 23 heats the thermistor 23 to a temperature above the fluid on the other side of closure 22, the heat generated being transmitted through the heat conductive adhesive coating 25 and the closure 22. The pulsations of the fluid passing over the outer face of the closure 22 have a cooling effect on the thermistor 23 which is effective to provide a signal.

The relationship described between the thermistor 23, the heat conductive coating 25 and the closure 22 provides a good frequency response to changes in the surrounding fluid, either of flow or of temperature, as desired.

The force applied and maintained on the closure 22 by the thermistor 23 and the structure in engagement therewith provides a good electrical contact and good heat conductivity. It has been found by experience that unless this engagement force is employed, electrical and thermal contact becomes lost through the effect of aging, vibration and temperature change.

The thin metal of the closure 22 contributes to good heat conductivity with respect to the thermistor 23 and a spring like action to maintain the desired engagement.

The mounting of the thermistor 23 at the center of the thin walled closure 22 and the free peripheral portions of the closure 22 beyond the thermistor 23 provides thermal insulation from the surrounding heat sinks, including the body 10 and the structure in which it is carried.

The compensatory thermistor 40 located in the interior of the body 10 can be utilized to compensate for temperature changes which occur gradually within the fluid.

A thermally insulating coating 35, such as teflon, may be applied to the outside surface of closure 22 at all points except those directly opposite thermistor 23 providing a window, as at 36, for the purpose of concentrating or limiting the region in which heat is transferred to the fluid. It has been found by experience that in many cases this further improves the frequency response of the probe.

I claim:

1. In measuring apparatus for measuring a condition in a fluid,
   a metallic body having an opening at one end,
   a thin walled metallic closure for said opening having an outer face exposed to the fluid, and
   a temperature sensitive electrical element engaged within the inner face of said closure,
   said temperature sensitive element being held in engagement with said inner face by an electrical and heat conductive adhesive cement.

2. In measuring apparatus for measuring a condition in a fluid,
   a metallic body having an opening at one end,
   a thin walled resilient metallic closure disc for said opening having an outer face exposed to the fluid, and
   a temperature sensitive electrical element engaged with the inner face of said closure,
   said disc providing a resilient force for maintaining contact between said disc and said element.

3. In measuring apparatus for measuring a condition in a fluid,
   a metallic body having an opening at one end,
   a thin walled metallic closure for said opening having an outer face exposed to the fluid, and
   a temperature sensitive electrical element engaged with the inner face of said closure,
   said closure having a thermal insulating coating on the outer face provided with a window facing said element for heat transfer through the window between the fluid and said element.

* * * * *